C. H. O'ROURKE.
AQUARIUM.
APPLICATION FILED NOV. 2, 1920.
1,438,133.
Patented Dec. 5, 1922.
2 SHEETS—SHEET 1.
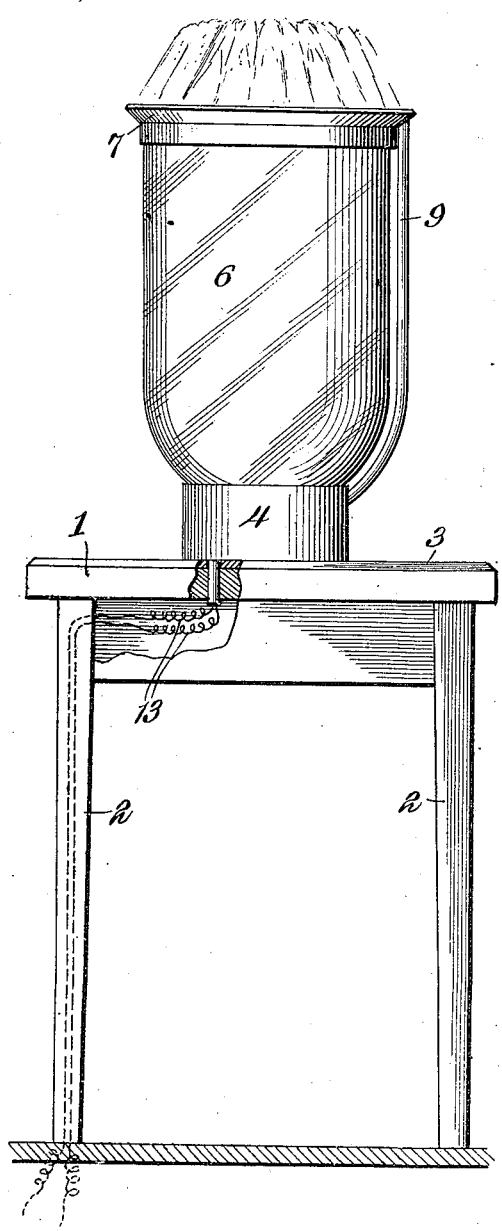
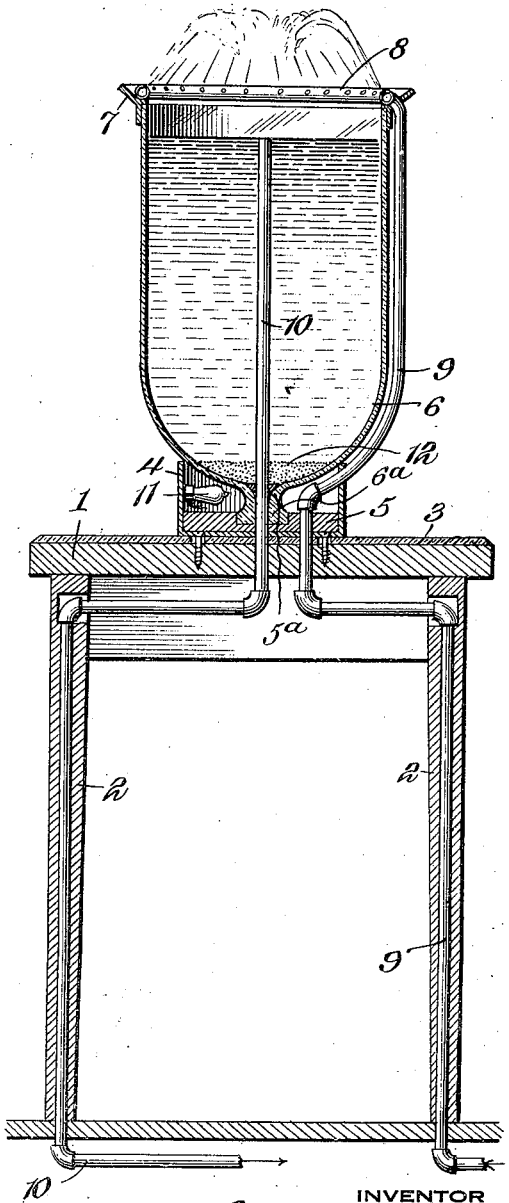
INVENTOR

C. H. O'ROURKE.
AQUARIUM.
APPLICATION FILED NOV. 2, 1920.

1,438,133.

Patented Dec. 5, 1922.
2 SHEETS—SHEET 2.

INVENTOR
C. H. O'Rourke
BY James J. Sheehy
ATTORNEYS

Patented Dec. 5, 1922.

1,438,133

UNITED STATES PATENT OFFICE.

CHARLES H. O'ROURKE, OF NEW ORLEANS, LOUISIANA.

AQUARIUM.

Application filed November 2, 1920. Serial No. 421,318.

*To all whom it may concern:*

Be it known that I, CHARLES H. O'ROURKE, a citizen of the United States, residing at New Orleans, in the parish of Orleans and State of Louisiana, have invented new and useful Improvements in Aquariums, of which the following is a specification.

My present invention pertains to aquariums and the like, and it contemplates the provision of means whereby the care and display of gold fish or other aquarium species may be greatly facilitated.

My invention further contemplates the provision in an aquarium of an arrangement of elements for assisting in breeding and development of fish and their display for exhibitional purposes, with the purpose in view of prolonging the lives of the fish.

The invention in all of its details will be fully understood from the following description and claims when the same are read in connection with the drawings accompanying and forming a part of this specification, in which:

Figure 1 is a side elevation of the preferred embodiment of my invention as applied to a table or stand, and looking at one side of said table.

Figure 2, is a sectional view similar to Figure 1 but showing the water inlet and outlet pipes passing through the legs of the stand or table.

Similar numerals of reference designate corresponding parts in all the views of the drawings.

Figure 3:
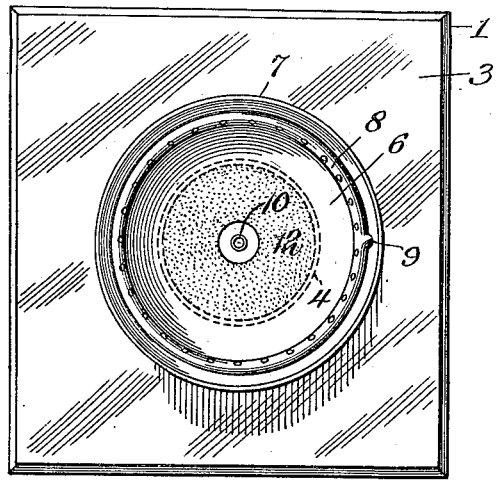
Figure 3, is a bottom plan view of the bottle or water container.
Figure 4:
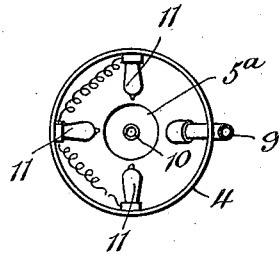
Figure 4 shows the arrangement of the electric lighting elements with respect to the base of the bottle and water inlet pipe.

In the preferred embodiment of my invention I provide the table or other fixture 1 having legs 2 and a mirrored top 3 upon which bears a cylindrical casing 4 of metal or other suitable material.

The water container 6 is of inverted bottle shape, and the neck 6ª thereof extends into the casing 4 and arranged in the casing 4 and screwed or otherwise secured to the top of the table is a member 5. The exterior is secured to the member 4 in a rigid manner and hence the neck 6ª of the bottle will be retained in a rigid manner within the casing and will be precluded from casual displacement from said casing. A plug of cork or other water-tight material 5ª is arranged in the neck 6ª.

At its extreme upper and outer surface, the container is provided with the band 7 having a guard or flange as illustrated and this guard prevents water from splashing out of the bowl or container.

As clearly shown in Figure 2, a water supply pipe 9 extends through one leg 2 of the table and through an opening in the sealing member 5 and thence up one side of the container 6 and communicates with a circular pipe 8 that extends completely around the upper end of the container. The pipe 9 passes through an opening in the flared portion of the band or collar 7 and the pipe 8 is provided with equi-distant spray openings as illustrated (Figure 2).

Extending through one of the legs 2 of the table is a water outlet pipe 10 and this pipe 10 extends through the central opening in the cork or plug 5ª and thence through the longitudinal center of the container 6 where it terminates slightly below the upper end of said container. Obviously the space around the pipe 10 where it passes through the plug 5ª is water-tight.

Extending through another of the legs 2 is electric wiring 13 that supplies current to illuminate the electric globes 11. The globes may be of various colors and are secured in the casing 4.

The wiring is manifestly connected with a source of suitable electric supply.

It will be appreciated that the pipes 9 and 10 will be concealed from view by the legs 2 and casing 4 as will also the plug 5ª and member 5. This is also true of the globes 11, but in order to prevent a person from seeing these elements through the lower end of the container 6, I frost the said end as indicated by 12.

It will be appreciated that a fresh inflow of water is maintained at all times and also that the water is prevented from overflowing the container 6 because of outlet pipe 10. This is materially advantageous in the breeding of gold fish and the like as the water is gradually fed into the container which precludes sudden chilling of the contents of the bowl 6 which sudden chilling accounts for the killing of fish in devices of this character now in use.

The illumination of the device greatly enhances the exhibiting qualifications of my invention. Moreover, the general nuisance of changing the water by hand is eliminated.

Having described my invention, what I claim and desire to secure by Letters Patent is:—

1. In an aquarium, the combination of a bowl open at its upper end and having a neck formed integral at the lower end, a closure arranged in the neck, a casing surrounding the neck, and bearing on the bowl, illuminating means arranged in the casing, a support on which the casing is secured, interiorly bored legs secured to the support, a liquid inlet extending through the bore of one leg and passing outside the bowl, and terminating in a circular pipe that is arranged in the upper end of the bowl; said circular portion of the pipe being provided with apertures to permit of liquid entering the bowl from the inlet, and an outlet pipe arranged in the center of the bowl and terminating at its upper end slightly below the open end of the bowl, and extending through the center of the closure of the neck and through the bore of the other leg of the support.

2. In an aquarium, the combination of a bowl of inverted bottle shape open at its upper end, a flange formed on the open end of the bowl, a casing surrounding the neck of the bowl, a support arranged below the casing and secured thereto, a liquid inlet pipe passing through one leg of the support and outside the bowl, and terminating in a pipe that is arranged inside the upper end of the bowl and having apertures therein whereby liquid is permitted to flow into the bowl and means secured to the bowl for preventing overflow of the liquid from the bowl and comprising a pipe arranged in the center of the bowl substantially as and for the purpose set forth.

In testimony whereof I have hereunto set my hand in presence of two subscribing witnesses.

CHARLES H. O'ROURKE.

Witnesses:
JOHN L. FELIES,
CARL A. CONRAD.